(12) United States Patent
Schmitt et al.

(10) Patent No.: US 8,757,309 B2
(45) Date of Patent: Jun. 24, 2014

(54) AUTONOMOUS MODULAR VEHICLE WHEEL ASSEMBLY

(75) Inventors: Peter Alfons Schmitt, Loef-Kattenes (DE); William J. Mitchell, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1218 days.

(21) Appl. No.: 12/492,128

(22) Filed: Jun. 25, 2009

(65) Prior Publication Data

US 2010/0116572 A1 May 13, 2010

Related U.S. Application Data

(63) Continuation-in-part of application No. 11/153,601, filed on Jun. 15, 2005, now Pat. No. 7,938,210.

(60) Provisional application No. 61/075,745, filed on Jun. 25, 2008, provisional application No. 60/579,972, filed on Jun. 15, 2004.

(51) Int. Cl.
*B60K 7/00* (2006.01)

(52) U.S. Cl.
USPC .............. 180/65.51; 180/411; 280/93.512

(58) Field of Classification Search
USPC ........ 180/65.5, 411, 65.51; 280/93.512, 81.6, 280/86
See application file for complete search history.

(56) References Cited

U.S. PATENT DOCUMENTS

| | | | | |
|---|---|---|---|---|
| 5,547,038 A * | 8/1996 | Madwed | ........................ | 180/253 |
| 5,699,873 A * | 12/1997 | Moriya et al. | ................ | 180/402 |
| 6,478,099 B1 * | 11/2002 | Madwed | ........................ | 180/21 |
| 6,549,835 B2 * | 4/2003 | Deguchi et al. | ................. | 701/41 |
| 6,827,176 B2 * | 12/2004 | Bean et al. | ..................... | 180/411 |
| 7,255,194 B2 * | 8/2007 | Lim et al. | ...................... | 180/411 |
| 7,464,785 B2 * | 12/2008 | Spark | ............................ | 180/236 |
| 7,520,362 B2 * | 4/2009 | Wierzba et al. | ............... | 180/253 |
| 7,617,890 B2 * | 11/2009 | Romig | ......................... | 180/6.48 |
| 7,740,102 B2 * | 6/2010 | Tsukasaki | ...................... | 180/408 |
| 7,798,262 B2 * | 9/2010 | Lundstrom | .................. | 180/14.1 |
| 7,810,823 B2 * | 10/2010 | Van Mill et al. | ............. | 280/81.6 |
| 2005/0242540 A1 * | 11/2005 | Gottschalk | .............. | 280/93.512 |
| 2006/0131097 A1 * | 6/2006 | Lim et al. | ...................... | 180/411 |
| 2007/0240928 A1 * | 10/2007 | Coltson et al. | ............... | 180/411 |
| 2009/0188740 A1 * | 7/2009 | Wierzba et al. | ............... | 180/236 |
| 2010/0051375 A1 * | 3/2010 | Sherwin | ......................... | 180/411 |
| 2011/0227306 A1 * | 9/2011 | Ursu | ......................... | 280/93.512 |

* cited by examiner

Primary Examiner — John Walters
(74) *Attorney, Agent, or Firm* — Norma E. Henderson

(57) ABSTRACT

An autonomous modular wheel assembly includes at least one connector for connecting the wheel control assembly to a vehicle axle, one or more suspension arms that support the assembly with respect to the axle, an electric drive motor connected to a the vehicle wheel, a steering bearing, and a steering actuator. The electric drive motor and steering bearing control the operation of the vehicle wheel in response to commands received via the actuator. The connector has one or more electrical connection points for providing power and information to the wheel assembly. The robot wheel increases the vehicle steering range to up to 150 degrees and enables new vehicle drive modes. The traditional +/−30 degrees of front wheel steering are enabled, as well as at least three new drive modes: four wheel parallel and converse steering, spin on spot steering, and 90 degree sideways motion.

18 Claims, 13 Drawing Sheets

RELATIONSHIP BETWEEN STEERING ANGLE AND
SPEED DURING TURNING. FRONT WHEEL STEERING

AUTONOMOUS MODULAR VEHICLE WHEEL ASSEMBLY

RELATED APPLICATIONS

This application claims the benefit of U.S. Provisional Application Ser. No. 61/075,745, filed Jun. 25, 2008, the entire disclosure of which is herein incorporated by reference.

This application is also a continuation-in-part of co-pending U.S. patent application Ser. No. 11/153,601, filed Jun. 15, 2005, the entire disclosure of which is herein incorporated by reference, which claims the benefit of U.S. Provisional Application Ser. No. 60/579,972, filed Jun. 15, 2004, the entire disclosure of which is herein incorporated by reference.

FIELD OF THE TECHNOLOGY

The present invention relates to vehicle suspension and drive systems and, in particular, to a robotic wheel assembly.

BACKGROUND

Cars today are extremely complex due to the many subsystems that support the reliable performance of high-level functions within a single compact device. The internal combustion engine (ICE), drive train, gearbox, electrical systems, climate-control unit, computational systems, networking devices, passenger compartment, trunk, and additional components all combine to form the overall vehicle. The car body itself has also evolved into a highly sophisticated piece of engineering that fulfills multiple functions, including stability and safety. In particular, the shift to internal combustion engine vehicles has impacted vehicle architecture as a whole. ICE vehicles have one central and embedded propulsion force creating rotational shaft work that is transmitted to the wheels. This vehicle architecture became the paradigm that is still current.

Interest in electric vehicle drive units is resurging with the proliferation of hybrid and electric vehicles. Purely electric vehicles originally used hub mounted motors in the wheel that were easier to handle and more efficiently translated force the wheels. Over time, however, hub mounted electric motors degenerated into an electrical assistance and starter motor for the internal combustion motor. Today's hybrid vehicles utilize more powerful electric drive motors, but still stay within the current paradigm by embedding the electric motor like an ICE. However, the renaissance of hub-mounted electric motors in some purely electric and hybrid cars has not yet led to a fundamental rethinking of vehicle architectures.

Currently emerging key technologies are in-wheel motors, electric braking, integrated steering activators, and active suspension combined with embedded sensors and real time computation. These electric vehicle drive units have the potential to go beyond current applications and lead to novel vehicle architectures and a new vehicle culture. In-wheel motors have been researched extensively and are currently experiencing a renaissance with the development of hybrid and electric cars [Eastham, J. F., Balchin, M. J., Betzer, T., Lai, H. C., and Gair, S, In Proc. ISIE 1995 of the IEEE International Symposium on Industrial Electronics, 2 (10-14 Jul. 1995), pp. 569-573; Zielinski, P., and Schoepp, K., "Three-phase low-speed permanent magnets synchronous Machines", Institute of Electrical Machine Systems, Technical University of Wroclaw, Poland]. Steering actuators have been placed within-wheels for forklifts and buses. In-wheel suspension and modularity is a well-known principle for platforms carrying heavy loads. Mitsubishi is one of the first large automobile manufacturers to include in-wheel motors in a passenger car, the Colt EV, which is part of a series called the Mitsubishi In-wheel Motor Electric Vehicle (MIEV).

The Michelin Active Wheel consists of a traction motor, a disc brake and caliper, and all active suspension components. The Michelin active wheel does not include a connection point between the wheel and the vehicle, the steering range remains within the traditional limits of +/−30 degrees, and the wheels are not controlled by an autonomous computational device within the wheel.

The Siemens E-Corners makes use of the Electronic Wedge Brake, a pure electronic brake caliper developed by Siemens. A linear motor is built around the brake and a suspension unit is placed in the center of the wheel. A bolt on bracket connects the E-Corner to the vehicle body and allows for the traditional +/−30 degrees of steering range. In contrast to the proposed Robot Wheel design, the Siemens E-Corners do not enable a steering range of up to 150 degrees. Although the Electronic Wedge Brake makes use of an integrated CPU and functions as an information hub in the vehicle data bus system, E-Corners are not intended to function in an autonomous and modular way.

To date, only one concept vehicle has successfully demonstrated the same type of simplicity and multi-functionality as the design principles for wheel robots: the Mini Cooper Concept Car modified by Printed Motors, Ltd. (PML) (2006). The PML car is the first widely known concept vehicle with a simple, multifunctional, in-wheel motor design. This vehicle showcases the capabilities of PML's electric in-wheel motors and their multifunctionality. Not only do the in-wheel motors accelerate and decelerate the vehicle, they also brake. In other words, the PML car has no dedicated braking system because the in-wheel motors are powerful enough to perform the functions of a traditional brake system. Although the PML car uses one-of-a-kind, hand-made electric motors the specifications of the series in-wheel motors prove the feasibility of designing a safe vehicle without brakes. The PML in-wheel motors allow for up to 640 nm of stall torque (30 sec max) which can be used for acceleration or deceleration. Also, each in-wheel motor weighs only 18 kg despite an oversized, conventional five-bolt wheel bearing. The weight is comparable to a conventional wheel bearing disc brake assembly, which means the unsprung or rotational mass is not increased by the in-wheel motors. Thus, the PML car fulfills three roles in the electric vehicle: acceleration, deceleration, and power generation through regenerative braking. These goals are accomplished without increasing the unsprung mass of the wheel assembly.

U.S. patent application Ser. No. 11/153,601, filed Jun. 15, 2005 (U.S. Pat. App. Pub. No. US2006/0012144; Kunzler et al., Jan. 19, 2006), of which the present application is a continuation-in-part and which is incorporated by reference herein in its entirety, discloses the first hubless design for a wheel robot. The Kunzler et al. approach mainly focuses on several in-wheel suspension mechanisms to reduce the unsprung and rotational mass. It permits the motor and other heavy components to remain stable while only the rim, tire, and wheel bearing are unsuspended. The suspension travels vertically along two shafts. A third shaft transmits the drive force via a gear that slides on the shaft's triangular cross section. The design uses a hubless wheel bearing which makes the center of the wheel available for other components.

SUMMARY

In one aspect, the autonomous modular wheel assembly of the present invention increases the vehicle steering range to up to 150 degrees and enables new vehicle drive modes. The traditional +/−30 degrees of front wheel steering are enabled, as well as at least three new drive modes: four wheel parallel and converse steering, spin on spot steering, and 90 degree sideways motion.

An autonomous modular wheel assembly according to one aspect of the present invention includes at least one connector for connecting the wheel control assembly to a vehicle axle, one or more suspension arms that support the assembly with respect to the axle, an electric drive motor connected to a the vehicle wheel, a steering bearing, and a steering actuator. The electric drive motor and steering bearing control the operation of the vehicle wheel in response to commands received via the actuator. The connector has one or more electrical connection points for providing power and information to the wheel assembly. The system fits inside a typical vehicle wheel, with the exception of the connector and suspension arm that extend out towards the chassis.

In a preferred embodiment, the assembly employs a microcontroller to read out a wheel revolution sensor, a wheel steering sensor, and an up/down, back/forward, left/right (3 axes) acceleration sensor. Together with the steering angle and vehicle speed data provided by the vehicle, the assembly computes its position, specific steering angle, and acceleration or deceleration values. By cross-referencing these data with the back/forward acceleration sensor, the assembly can detect emergency situations and autonomously counteract them.

BRIEF DESCRIPTION OF THE DRAWINGS

Other aspects, advantages and novel features of the invention will become more apparent from the following detailed description of the invention when considered in conjunction with the accompanying drawings wherein.

DETAILED DESCRIPTION

In the present invention, a modular system of units can drive, brake, steer, and suspend an electric vehicle. These units are referred to as "robot wheels" because they are autonomous elements that can be connected to any electric vehicle chassis. Each unit includes an electric motor, a steering element, a suspension arm and a connector. The system fits inside a typical vehicle wheel, with the exception of the connector and suspension arm that extend out towards the chassis.

In one embodiment, the present invention provides novel mechanical and electric robotic wheel technology, with associated control and drive software in a fully functional concept vehicle. It makes use of the modular design for robot wheels combined with applied automotive technologies. The modular vehicle drive unit can be successfully adapted to car wheel design and lead to a different kind of vehicle architecture. The interchangeable units are capable of driving, braking, suspending and steering different types of vehicles using electric activators. They communicate not only with the vehicle, but also with each other to address certain driving situations autonomously, such as, but not limited to, maintaining contact with the ground under all circumstances or calculating individual speed and angle settings during cornering. Augmented with sensors, activators and a certain amount of intelligence these units automate transportation, a basic human need, and thus deserve to be called wheel robots.

The robot wheel comprises a two-part connector, a connection arm that also suspends, a steering bearing and actuator and a hub-mounted in-wheel motor which drives a conventional wheel. The connection arm presents a conventional double wishbone suspension system. The connector is split into a vehicle side part and a robot wheel side part. Both parts establish a structural connection once they are linked together. In addition, an electrical and a data-electrical connection are made in order to supply power and information to the robot wheel unit. The present invention has been reduced to practice as a 1:2 scale prototype, as described in Schmitt. P., "Just Build It! A Fully Functional Concept Vehicle Using Robotic Wheels", MIT Master Thesis, Program in Media Arts and Sciences, 2007.

Figure 1:
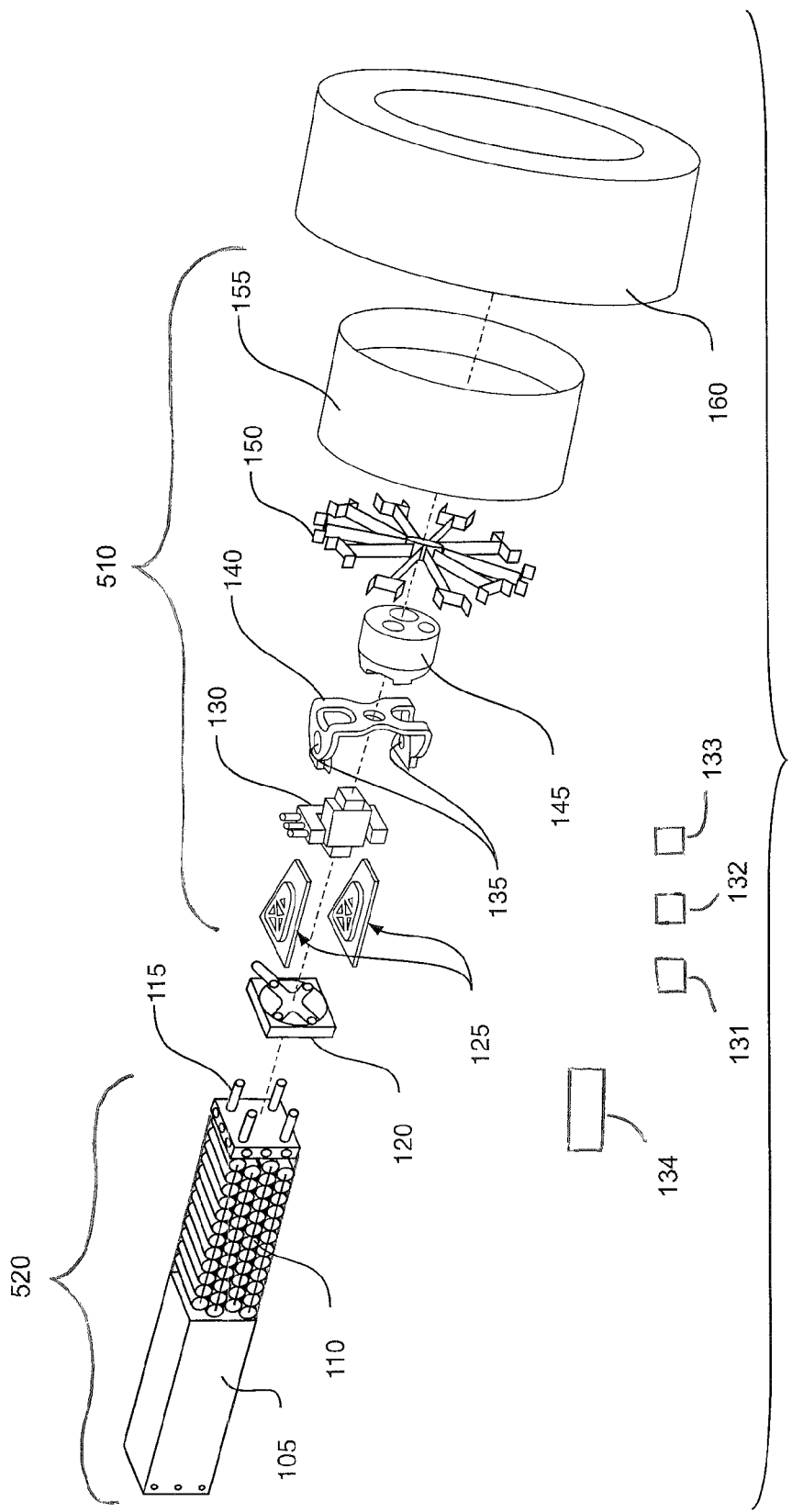
FIG. 1 is an exploded view of an embodiment of a robot wheel according to one aspect of the present invention.
Figure 2:
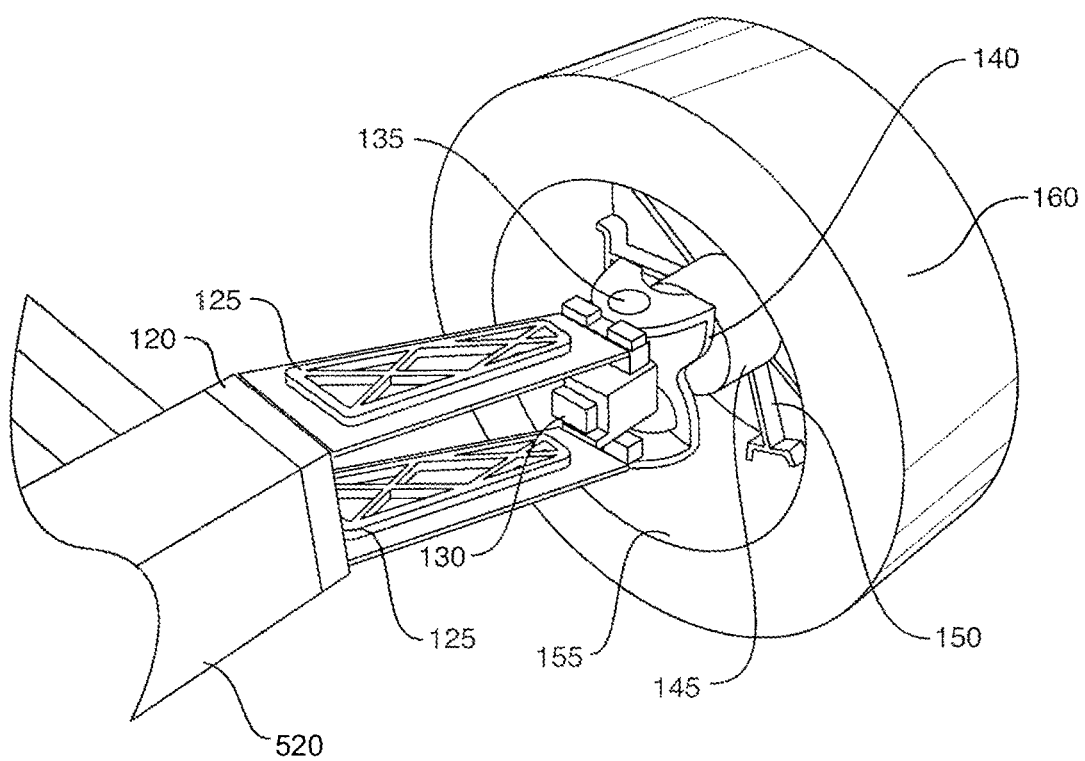
FIG. 2 is an assembled robot wheel assembly according to FIG. 1.

FIG. 1 is an exploded view of an exemplary embodiment of a robot wheel according to one aspect of the present invention. In FIG. 1, robot wheel 100 is comprised of axle 105, batteries 110, vehicle side connector 115, wheel robot side connector 120, Flexible suspension arms 125, steering actuator 130, optional sensors 131, 132, 133, optional on-board controller 134, steering bearing 135, motor mount 140, motor 145, spokes 150, rim 155, and tire 160. FIG. 2 is an assembled robot wheel assembly according to FIG. 1.

The suspension arm is inspired by the PML technology, which demonstrates that an in-wheel motor does not necessarily increase the unsprung mass in the wheel robot. This fact gives the designer more freedom to rethink the working principle of the suspension, as it will not have to compensate for additional mass. The connection arm itself is used as a suspension component instead of a complex in-wheel suspension. In addition, the Cannonadale scalpel carbon flexure rear suspension bike frame (2005) shows how mechanical joints to pivot the suspension arms can be eliminated. A simple carbon-reinforced composite material allows for the necessary flexing of the suspension. This composite part is reinforced by aluminum plates to restrict the flex to the desired areas. The geometry and placement of the suspension and connection arm enables a greater steering range and solves many past issues related to rotational/unsprung mass.

Figure 3:
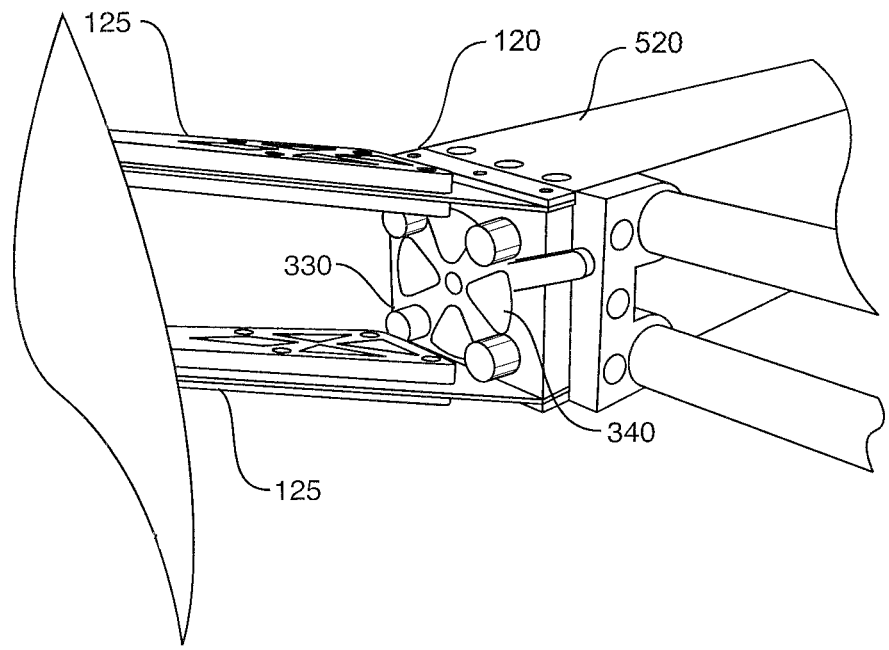
FIG. 3 is a preferred embodiment of a connection/suspension arm, according to one aspect of the present invention.

FIG. 3 depicts a preferred embodiment of a connection/suspension arm for the left front wheel, according to one aspect of the present invention. In the embodiment of FIG. 3, wheel robot connection arms 125 allow for 150 degrees of steering and connect the modular wheel robot unit to battery unit/axle 520 via whell robot side connectors 120 Connector 120 is provided with connector bolts 330, for structural and electrical connection, and connector tightening assembly 340, which has individual metal plates for electrical connection. The modified suspension arm design makes it possible to place the connector at the border between wheel motion envelope and vehicle. This position offers benefits over previous positions that are closer to the wheel, because it allows for a significant simplification of the wheel robot design and assembly. This basic configuration of connector and suspension arm also determines the position of the steering bearing, actuator and the motor. The steering components are placed at the other end of the suspension arm and connect directly to the motor, which is also the hub of the wheel.

The robot wheel augments vehicle agility by increasing the steering range and enabling new vehicle drive modes. The robot wheels of the present invention are capable of steering up to 150 degrees. Two innovations make this steering range possible: (1) the location of the robot wheel connector on the side and at the boundary of the wheel motion envelope; and (2) the special shape of the connection arm between the connector and the wheel. The traditional +/−30 degrees of front wheel steering are possible, as well as three new drive modes: four wheel parallel and converse steering, spin on spot steering, and 90 degree sideways motion. Even in the 90-degree sideways mode, steering of +/−30 degrees can be achieved. In a preferred embodiment, the robot wheels make use of a microcontroller or a other CPU to read out a wheel revolution sensor, a wheel steering sensor, and an up/down, back/forward, left/right (3 axes) acceleration sensor. Together with the steering angle and vehicle speed data provided by the vehicle, the robot wheel computes its position, specific steering angle, and acceleration or deceleration values. By cross-referencing these data with the back/forward acceleration sensor, the robot wheel can detect emergency situations, such as slipping or impacts, and then can autonomously counteract them.

Figure 4A:
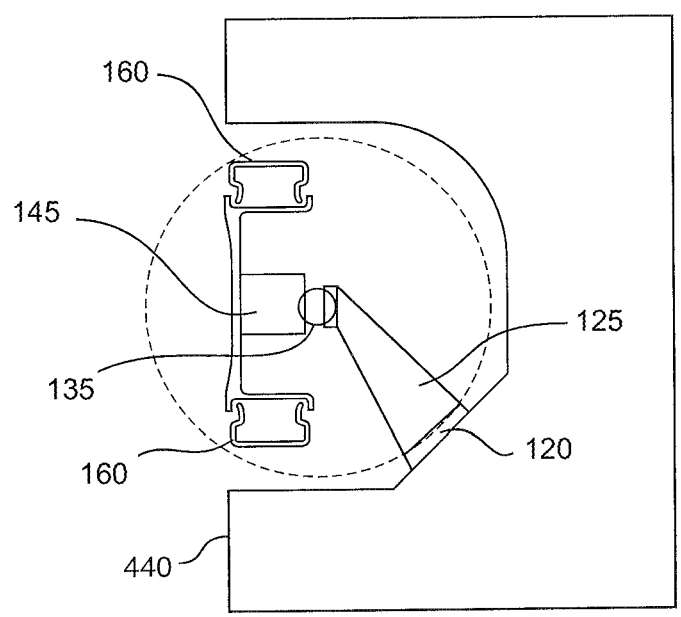
FIGS. 4A-C illustrate the robot wheel connector location and steering range for a front left wheel, according to one aspect of the present invention.
Figure 4B:
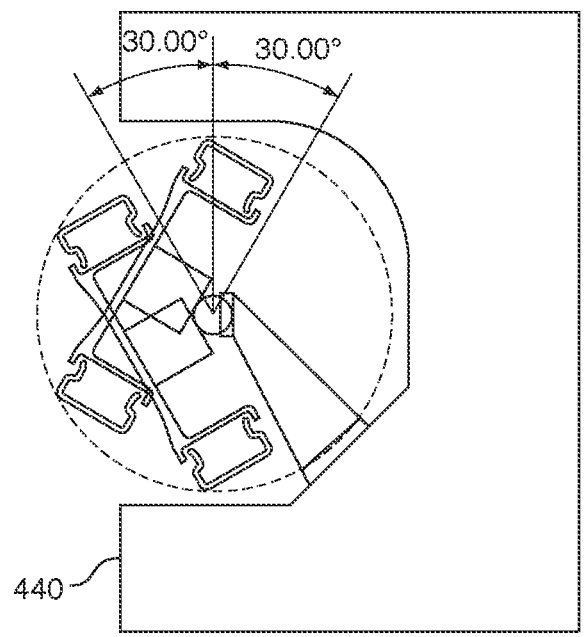
Figure 4C:
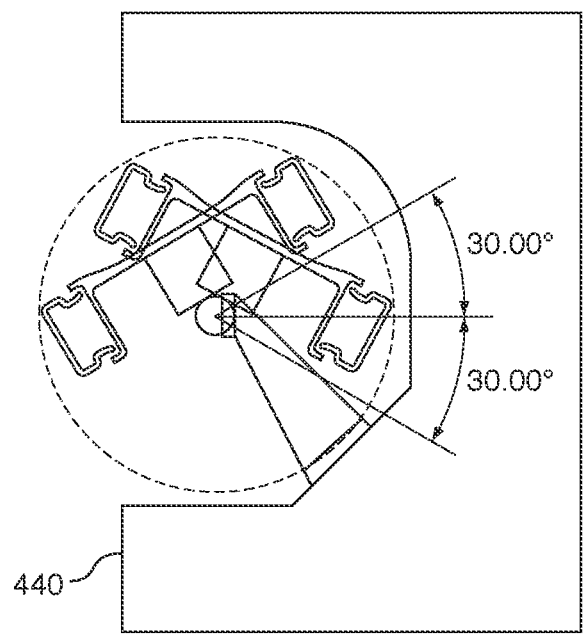

FIGS. 4A-C illustrate three possibilities for the robot wheel connector location and steering range for a front left wheel, according to one aspect of the present invention. In FIGS. 4A-C, the positions of connector 120, connection arm 125, steering bearing 135, motor 145, and tire 160 are illustrated in cross-section with respect to vehicle 440. In FIG. 4A, vehicle 440 is driving straight. In FIG. 4B, vehicle 440 is in traditional drive mode with a steering capability of left-right 30 degrees each (60 degrees altogether). In FIG. 4C, vehicle 440 is in sideways drive mode, with a steering capability of left-right 30 degrees (150 degrees over all steering motion).

Figure 5:
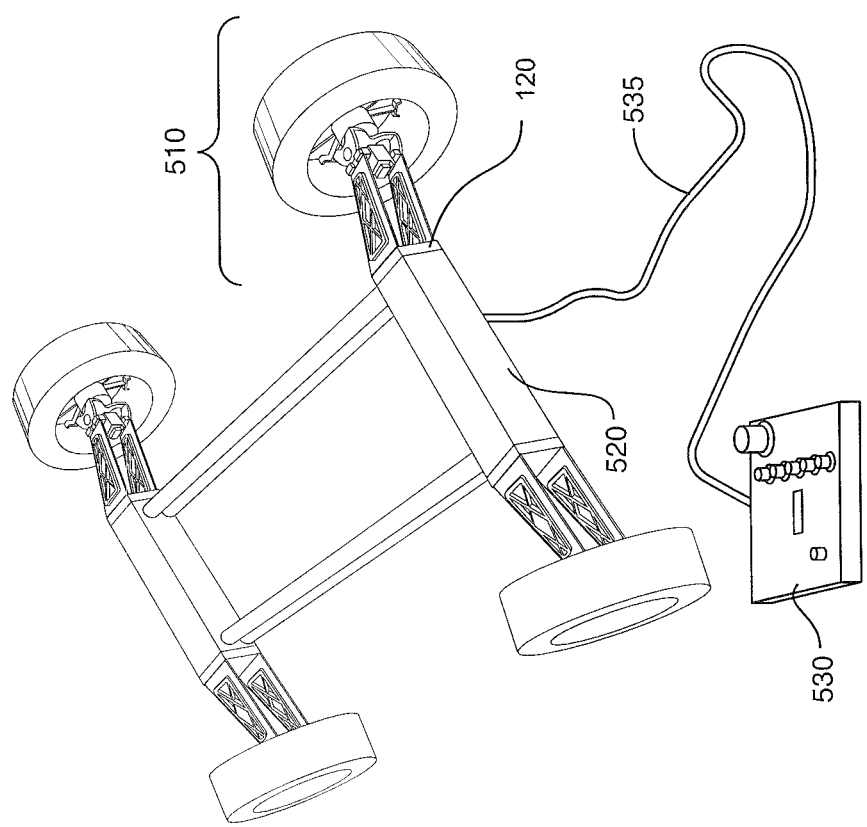
FIG. 5 is an exemplary embodiment of a robot wheel and concept vehicle assembly, according to one aspect of the present invention.

FIG. 5 is an exemplary embodiment of a robot wheel and concept vehicle assembly, according to one aspect of the present invention. In FIG. 5, modular robot wheel unit with connector 510 is shown without a tire, connected to battery unit/axle 520 via wheel robot side connector 120. The vehicle is controlled via driver input unit 530 with network bus connection 535. This embodiment of a robot wheel assembly has the infrastructure to compute sensor data and determine drive unit behavior locally. The units can also participate on a data bus with other drive units and vehicle systems. The connector between the robot wheel and the chassis establishes the data link. The same connector also creates a structural and electrical link to the chassis. The vehicle essentially comprises a front and rear axle that house the batteries and end with four connector bolts on each side. Simple spacer rods have been placed between the axles. This platform serves as a test-bed for a new wheel robot iteration that implements the design principles of multifunctionality and simplicity.

Even though wheel robots reduce the constraints on vehicle architecture, they have some specific constraints. The two most important factors are accommodating additional mass in the wheel and finding space for many more components than typical for a wheel. Fitting more components into the wheel raises the question of the unsprung and rotational mass. The unsprung and rotational mass describes the mass of the components (tire, rim, hub, and disk brake) that travel vertically during suspension. In most cases, adding components to the wheel increases the unsprung mass and destabilizes the vehicle. Specifically, the relationship between the moment of inertia of the unsprung mass and the suspension force changes. When the unsprung mass increases, it takes longer for the suspension to regain ground contact after overcoming obstacles on the road. There are two distinct approaches to minimizing the effects of additional unsprung and rotational mass. The first approach adjusts the suspension (damper, geometry, connection to vehicle) to compensate for the additional mass in the wheel. Another approach is to reduce the unsprung and rotational mass as much as possible. As shown in the work of Kunzler et al. (U.S. Pat. App. Pub. No. US2006/0012144), stabilizing the motor and making it independent from the wheel suspension movement is an alternative to the hub-mounted motor. In addition to addressing the impact of additional unsprung and rotational mass in the wheel, the wheel robots must integrate suspension, steering, braking, control and drive electronics and a connector into or near the wheel. Despite accommodating all these functions a wheel robot should be not exceed the motion envelope of a wheel inside the car body in size. There is also an opportunity to place some components in the space between the wheel and the chassis.

In contrast to the approach of Kunzler et al., the robot wheel design of the present invention does not employ any in-wheel suspension systems or other mechanism inside the wheel envelope to reduce unsprung and rotational mass. Rather than adding mechanisms to decouple sprung and unsprung masses and adding other mechanisms to transmit the drive force through the in-wheel suspension the robot wheel design simplifies the working principles and reduces the number of components. A significant influence on the present invention was the latest development of in-wheel motors and motor dependent braking. Recent improvements to in-wheel motors have decreased the weight and increased the performance of these components. As a result, in-wheel motors can be used to brake without reducing vehicle performance. Thus, no additional mechanisms are needed to reduce unsprung and rotational mass and conventional suspension systems can be used. These units have a greater steering range (up to 150 degrees) than previous inventions. This range enables new drive modes. For example, a driver could position the robot wheels parallel to each other and move the vehicle perpendicular to the drive direction. The connection arm accommodates the steering range of the units and suspends the vehicle. The present solution simplifies the design without impacting the unsprung/rotational mass balance of the unit. Unlike other robot wheel systems, each unit is fully autonomous and can respond dynamically to road conditions.

The position of the connector between the wheel robot and the vehicle is the starting point for the wheel robot. In previous designs, the connector does not extend far beyond the wheel robot. Instead, the space for the wheel motion envelope is provided by an "arm" reaching out from the chassis as in the first half-scale vehicle iteration. The arm is integrated into the wheel robot assembly by placing the connector more evenly spaced between a redesigned suspension arm and the vehicle.

The electric motor employed in the prototype embodiment resembles PML's motor technology, but its braking capability is not as outstanding. It is a model aircraft permanent magnet, 3-phase, brushless outrunner motor with 12 poles. The spokes of the rim connect from the motor to the rim cylinder where a run flat tire is mounted. In this way, the wheel robot achieves a much simpler design using fewer parts in a less complex configuration. It will be clear to one of skill in the art of the invention that many other motors may be advantageously employed in the present invention.

In the preferred embodiment, all four drive units have steering capabilities enabling several drive-modes for the vehicle. In the current design, the driver can select among five different drive-modes. The traditional drive-mode limits the vehicle to front wheel steering only. The parallel drive-mode rotates all four wheels simultaneously which allows for parallel line shifting. This mode does actually not cause the vehicle to perform any curved motion. In the converse drive-mode all four wheels are steered conversely towards each other. If the front wheels steer right, the rear wheels steer left, and by this the turning radius is decreased tremendously compared to traditional front wheel steering. The sideways drive-mode is similar to the parallel drive-mode, only the wheels are frozen to the 90-degree position in order to permit sideways motion. In this mode, the driver steering input is deactivated. The sideway drive-mode is very useful for parking in tight spots. The spin drive-mode is similar to the converse drive-mode, except that the wheels are frozen to a specific angle given the vehicle's width and length which allows it to spin on the spot. Again, the driver steering input is disabled. This drive-mode can be used for 180-degree turns and makes driving in reverse superfluous.

Figure 6A:
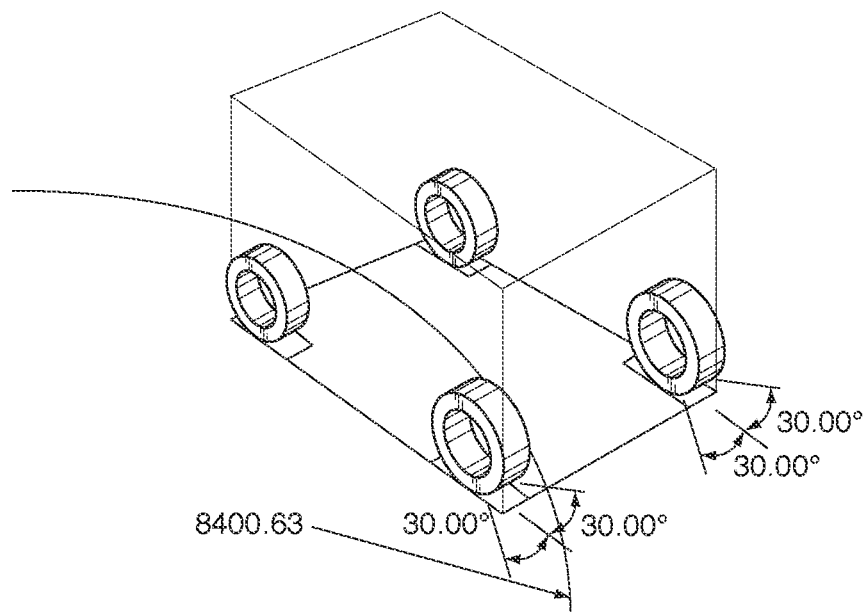
FIGS. 6A-E illustrate five drive modes of a vehicle using robot wheels, according to one aspect of the present invention.
Figure 6B:
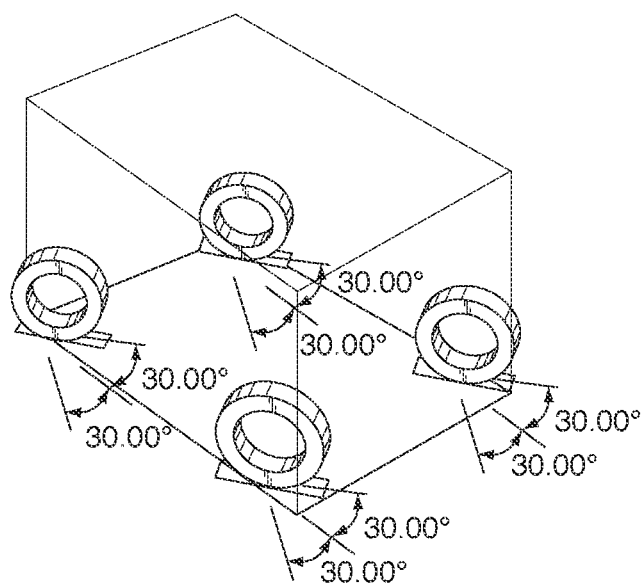
Figure 6C:
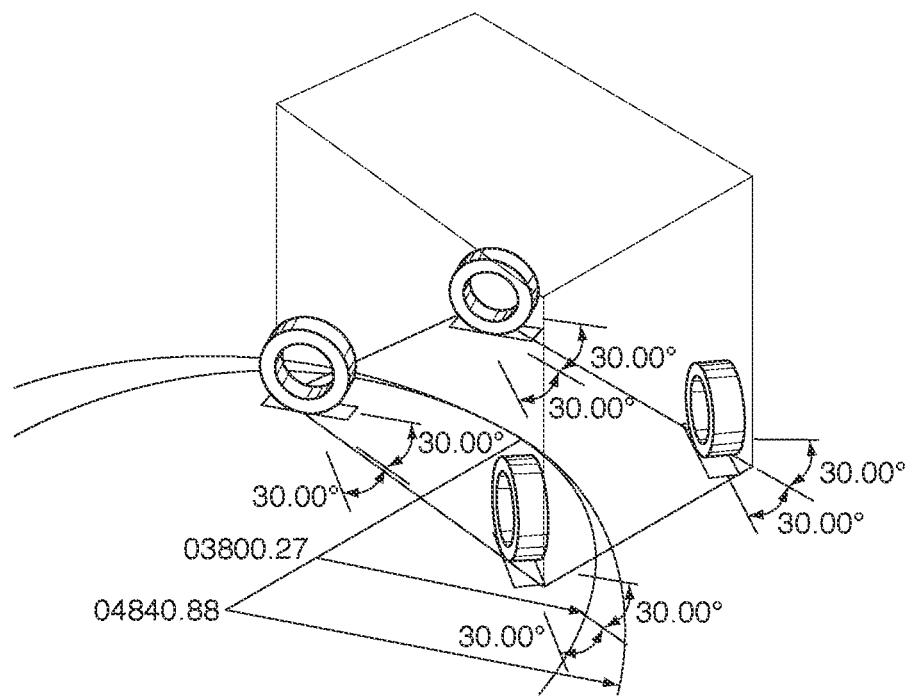
Figure 6D:
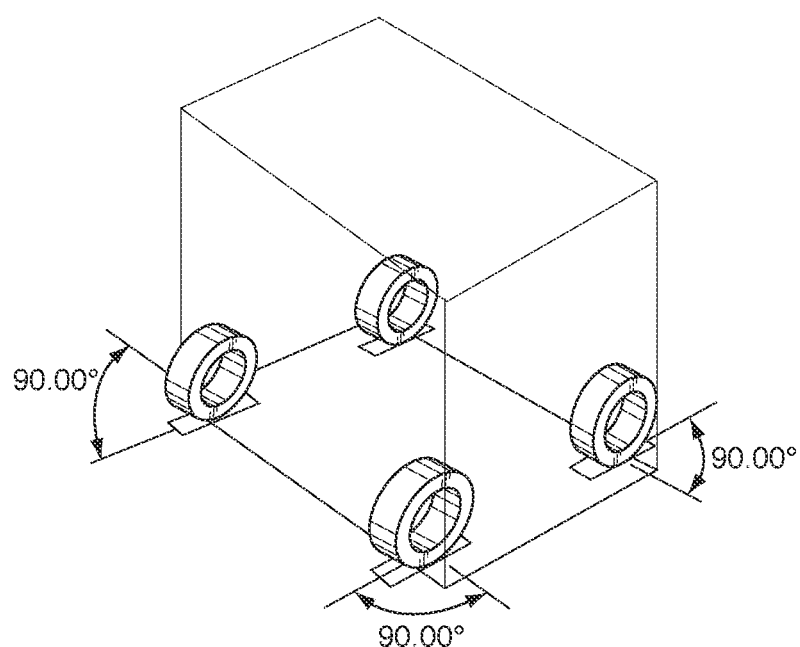
Figure 6E:
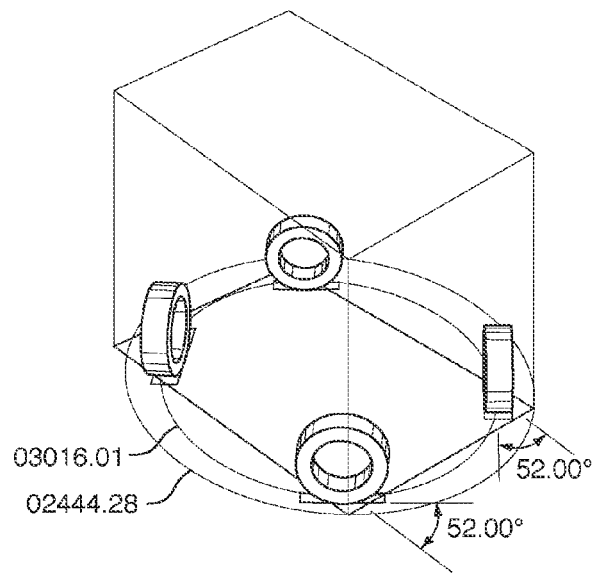

FIGS. 6A-E illustrate five drive modes of a vehicle using robot wheels, according to one aspect of the present invention. The steering capabilities of robot wheels enable several drive-modes for vehicles even if only two of the robot wheels have drive motors. The traditional drive-mode (FIG. 6A) limits the vehicle to front wheel steering only. The parallel drive-mode (FIG. 6B) rotates all four wheels simultaneously, which allows for parallel line shifting. In the converse drive-mode (FIG. 6C), all four wheels are steered conversely towards each other. If the front wheels steer right, the rear wheels steer left, decreasing the turning radius. FIG. 6C shows the minimum turning circles for 30 and 40 degrees of steering (40 degrees is the maximum). In the prototype embodiment, at 30 degrees, the turning circle diameter is 4840 mm, which is nearly half of the front wheel turning circle diameter of 8400 mm. The sideways drive-mode (FIG. 6D) is similar to the parallel drive-mode, save only that the wheels are at 90-degrees in order to allow for sideways motion. In this mode, steering of +/−30 degrees is also possible. The sideways drive-mode is very useful for parking in tight spots. The spin drive-mode (FIG. 6E) is similar to the converse drive-mode, save only that the wheels are frozen to a specific angle (52 degree) based on the vehicle's width and length, which allows it to spin on the spot. This drive-mode can be used for 180-degree turns and makes driving in reverse superfluous. The robot wheels also enable many other drive modes, such as, for example, "virtual pushing". In this mode, a driver operates the vehicle from the outside by interacting with four distance sensors placed on each side of the vehicle. When the driver places a hand in front of a sensor, the vehicle locks onto the hand. The front and rear sensors move the vehicle forwards and backwards. The left and right sensors move it sideways. This mode of operation allows the driver to make corrections to the vehicle's position once it is parked or folded.

Figure 7:
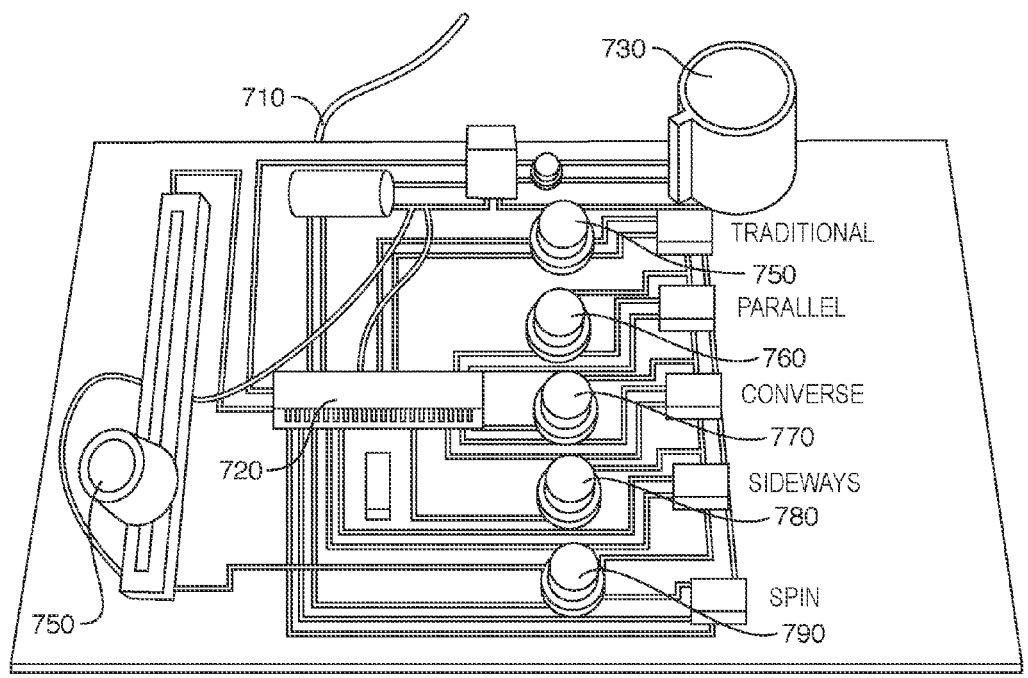
FIG. 7 is an exemplary driver input device used in the test vehicle setup, according to one aspect of the present invention.

In the prototype embodiment, the driver can select among five different drive-modes of FIGS. 6A-E, as shown in the detailed view shown in FIG. 7 of the exemplary driver-input device 530 (FIG. 5) used for the test vehicle setup. Shown in FIG. 7 are network bus connection 710, microcontroller 720, steering input nob 730, throttle slider 740, and buttons for traditional drive mode 750, parallel drive mode 760, converse drive mode 770, sideways drive mode 780, and spin on spot drive mode 790.

The driver input device makes it possible to switch between different drive modes by pressing the mode selection button and provides a throttle control potentiometer as well as a steering control potentiometer. The drive electronics architecture consists of four wheel robot microcontrollers participating as slaves in a two wire interface (TWI) bus and the driver input device participating as the master on the TWI bus. The wheel robot microcontrollers each interface with the motor drive electronic and the steering device. The driver input device reads in the potentiometer values and converts them. The two converted values and the drive-mode status is continuously transmitted via the TWI bus and the wheel robot microcontroller update their data registers accordingly.

The networked microcontroller approach has several advantages over a PC or similar high-level device. First, scalability is an important factor. State of the art vehicles use a controller area network (CAN) bus to interface between different participants like motor, brakes, doors, etc. For demonstration purposes, it is very useful to create a comparable system in which the wheels are active participants rather than passive instruction receivers. This approach is comparable to state of the art vehicle technology and can be scaled up to vehicles just by switching bus protocols. Second, separation of tasks within the network increases overall performance. The networked microcontroller approach grants the wheel robots some autonomy. They become semi-autonomous elements that govern their own functionality and compute the associated parameters on board. As a result, the wheels develop into a subsystem with independent capacities. The vehicle CPU or computer can then focus on other tasks. Third, augmenting the wheels with their own computational capacity increases the refresh rate of feedback loop and sensor readings and output cycles as compared to one computer taking care of all four wheels. Fourth, stability of operation increases with an increasing number of controllers and subsystems. Microcontrollers are presently significantly cheaper than any other solution.

The electronics require three major functional components. First, the driver input device has to be "read out". Second, the read value has to be sent to the networked devices. Third, an output signal has to be generated accordingly to the input data and other parameters. The electronics were designed to focus on the input-output functionality first and the networking second. Using the 10-bit analog to digital converter (ADC) on the microcontroller, the potentiometer is read in. This value serves for the pulse-width-modulation (PWM) signal generation feature supported by the microcontroller. The PWM signal is send to the motor controller or the steering servo where it is interpreted as a speed or position signal. The test rig operates a single wheel robot and proofed the concept as feasible. After this basic functionality was proven, the actual wheel robot microcontroller unit and the driver input device implementing the TWI bus were developed.

Despite the advantages of a high refresh rate, stable operation and low cost of microcontroller-based control electronics, there are some computational challenges that can be overcome. Unfortunately, the real-time processing power of a microcontroller CPUs is not capable of calculating a large number of parameters out of a broad geometry continuously. Computing the ideal outputs from the basic vehicle dimensions, wheel robot positions (front right, etc.) and driver input data would not be possible with the processor on-board the selected microcontroller. Therefore, the driver interface software in the prototype executes the formulas derived from a geometrical approximation of the specific wheel robot behavior.

The five drive-modes can be separated into two scenarios that require individual real-time computation: the traditional front wheel steering and all four wheel converse steering. The sideways drive-mode does not require any specific wheel robot computation because all wheels rotate to the 90-degree position and drive at the same, driver input speed. In the all four wheel parallel drive-mode the vehicle actually does not perform any curved motion. In other words, the same driver input angle and speed can be applied to all four wheels. The spin on spot case is a fairly easy situation in which the vehicle spins around its center point. The wheel robots are required to move to a fixed angle position that is directly related to the vehicle with and length. At this angle the wheels are tangential to the circle around the vehicle center trough the center points of all four wheels.

Figure 8:
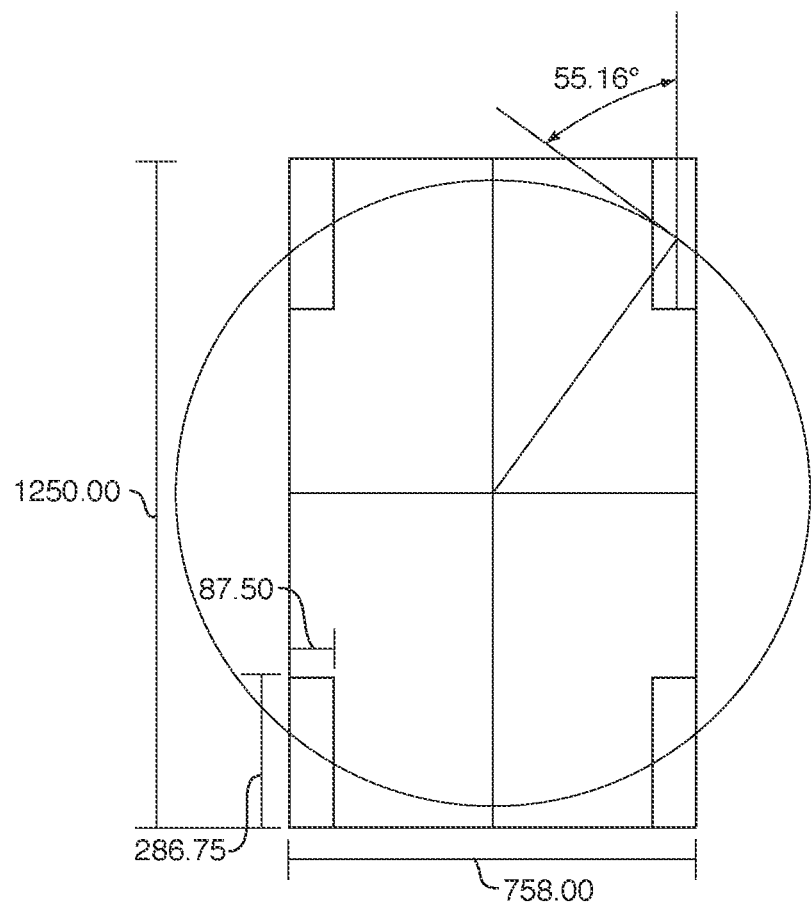
FIG. 8 is an exemplary spin mode angle determination diagram, according to one aspect of the present invention.

Using CAD software and a simplified drawing of the half-scale vehicle in top view, the angle of 55.16 degrees for the half-scale vehicle dimensions of 758 mm with and 1250 mm length was determined. FIG. 8 is an exemplary spin mode angle determination diagram, according to one aspect of the present invention. Instead of recalculating this value in real time, this angle value is stored as a variable in the wheel robot microcontroller and can be accessed at any time when the spin on spot drive-mode is activated by the driver through the interface device.

The procedure for determining the angles and turning radii is the same for the other two driving scenarios. Because the wheel robots are restricted to +/−30 degrees of steering and 100% of speed, the driver input data has to be mapped to the wheel robots in a way that assures no wheel robot extends the max values in any possible driving scenario. For example, the steering input data is mapped to the curve inner wheel because it needs to rotate more than the curve outer wheel while the speed input is mapped to the curve outer wheel because it travels on a bigger circle and needs to spin faster. This assures that the wheel robots only subtract specific factors from the input data rather than adding. For a sample set of 10 different input cases, the resulting corrections for the other wheels are geometrically determined.

Figure 9A:
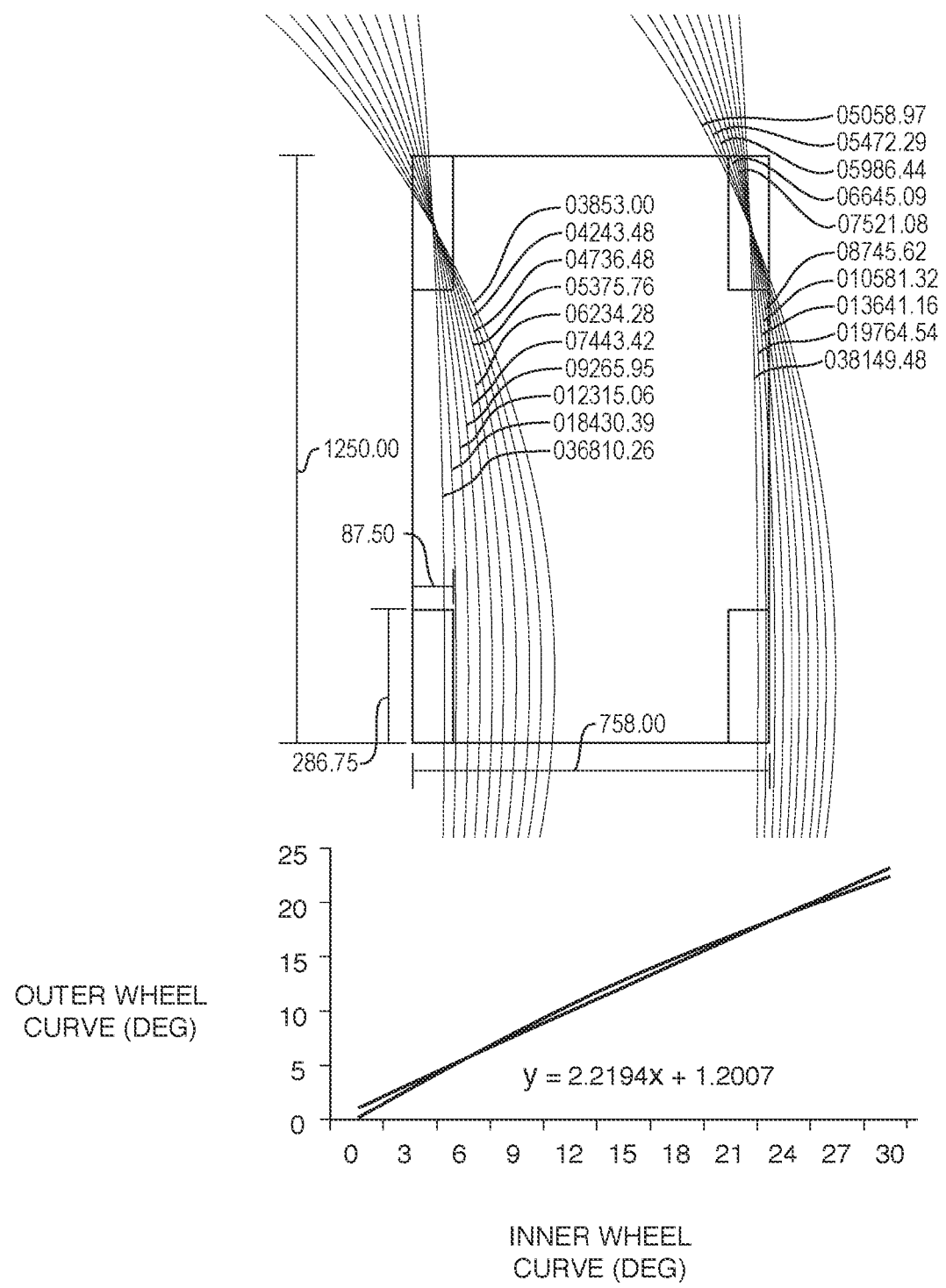
FIGS. 9A-D illustrate the geometrical approximation approach to determine dependency formulas, according to one aspect of the present invention.
Figure 9B:
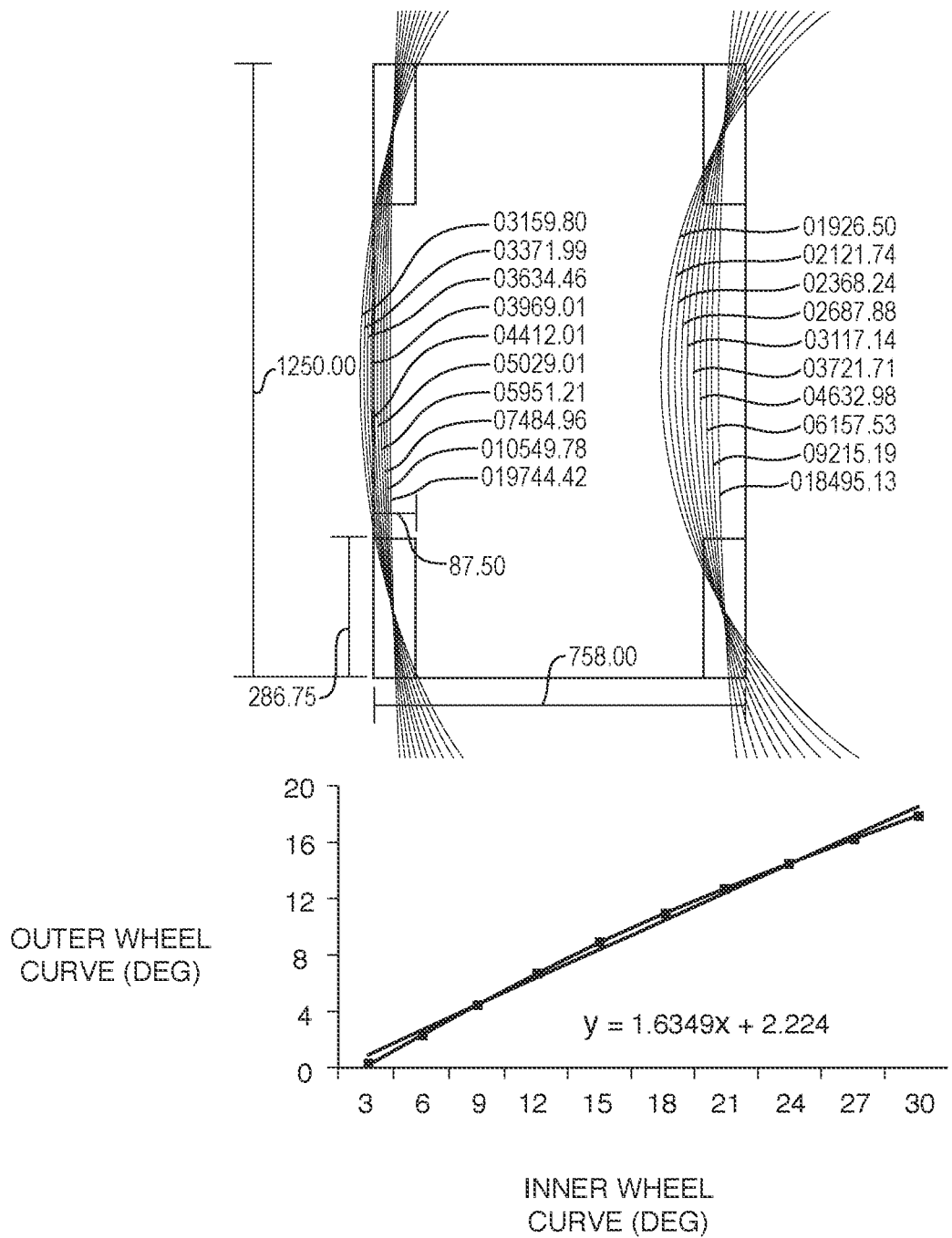
Figure 9C:
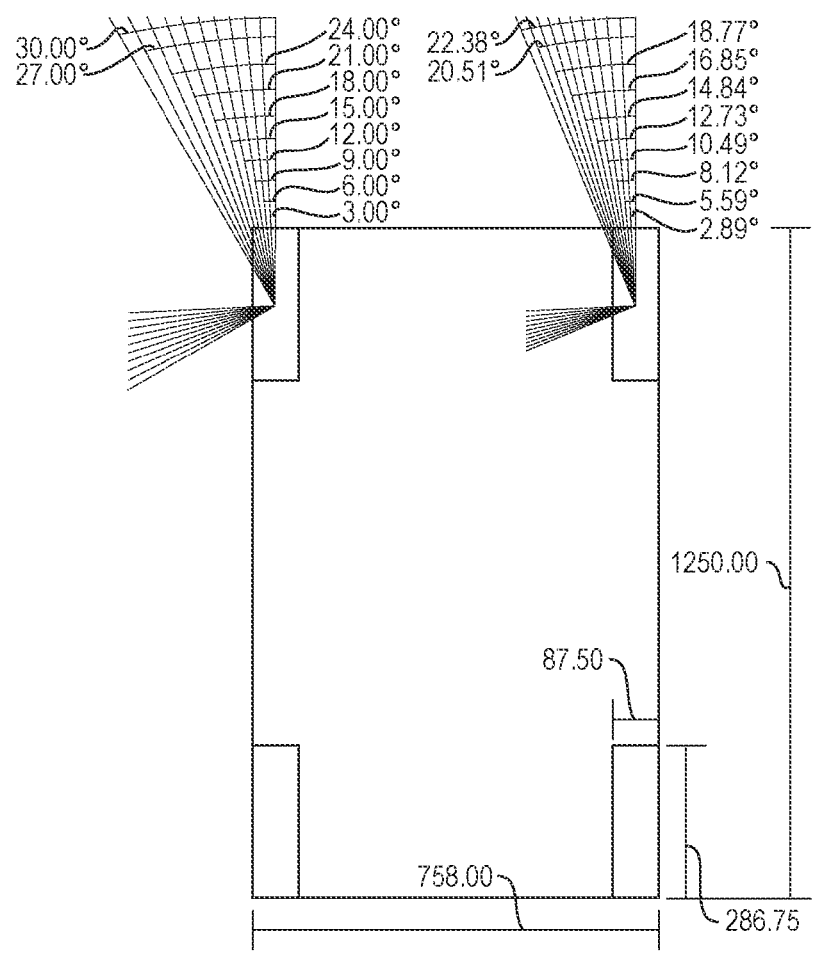
Figure 9C:
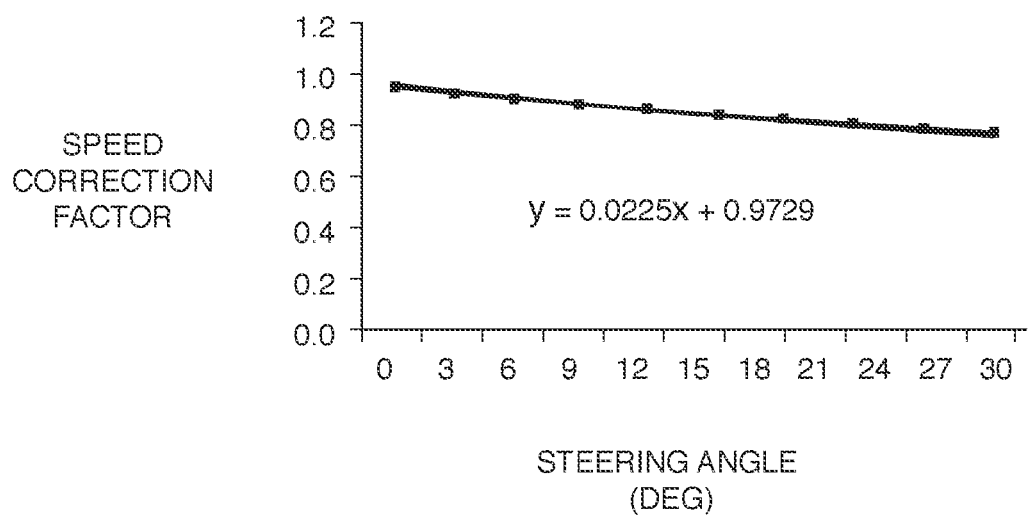
Figure 9D:
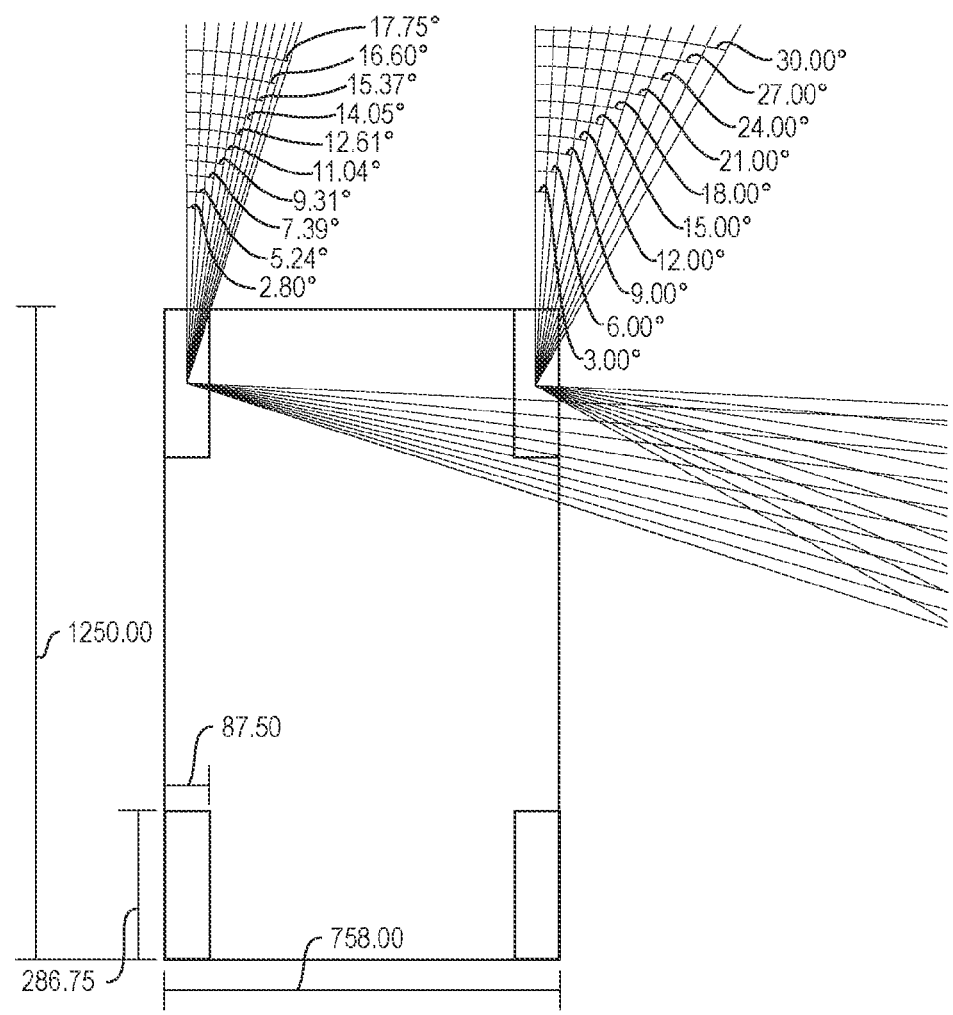
Figure 9D:
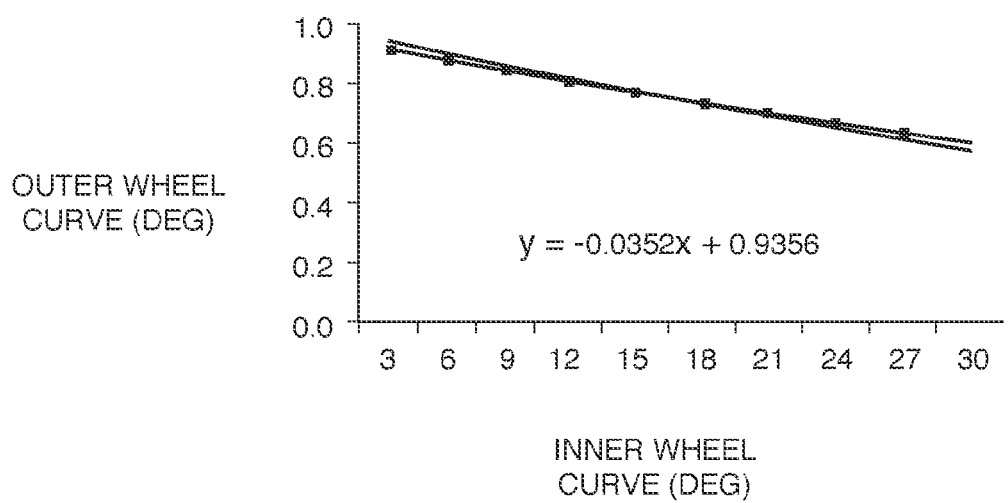

FIGS. 9A-D illustrate the geometrical approximation approach to determine dependency formulas, according to one aspect of the present invention. FIG. 9A depicts the relationship between the inner and outer wheel angle during turning, with front wheel steering. FIG. 9B depicts the relationship between the inner and outer wheel angle during turning, with converse steering. FIG. 9C depicts the relationship between steering angle and speed during turning, with front wheel steering. FIG. 9D depicts the relationship between steering angle and speed during turning, with converse steering.

The steering angle also describes the turning circle of the vehicle, which influences the individual speed of the wheels. In addition to the steering angles, the turning circle diameters were therefore also generated. For the scenario of traditional front wheel steering, the formulae are approximated as $y=2.2194x-1.2007$ for the steering angle corrections and $y=-0.0225x+0.9729$ for the speed value corrections. Accordingly, for the scenario of the four wheel converse steering, the formulae are approximated as $y=1.6349x+2.224$ for the steering angle corrections and $y=-0.0352x+0.9356$ for the speed value corrections. These formulae can be implemented into the wheel robot software, but should be updated whenever the wheel robots are connected to a vehicle with different dimensions.

Table 1 depicts how the findings are reflected in the source code for the example of the converse steering mode.

TABLE 1

```
{
if (position == 1) // front right
    {
        if ( steering_value > 512) // curve inner wheel, direct match steering value and correct speed value
            {
            pwm_steering_duty_cycle = ((steering_value + 4608) / 6.83); // output calculation, limits steering to +/− 30 degree
            set_steering_duty_cycle ( pwm_steering_duty_cycle ); // call output function with calculated value
            speed_value = ((−0.0352 * speed_value) + 0.9356); // y = −0.0352x + 0.9356
            pwm_speed_duty_cycle = ((speed_value + 1536) / 3.41);// output calculation, limits motor power to 50%
            set_speed_duty_cycle ( pwm_speed_duty_cycle ); // call output function with calculated value
            }
        if ( steering_value < 512) // curve outer wheel, correct steering value and direct match speed value
            {
            steering_value = ((1.6349 * steering_value) + 2.224); // y = 1.6349x + 2.224
            pwm_steering_duty_cycle = ((steering_value + 4608) / 6.83);// output calculation, limits steering to +/− 30 degree
            set_steering_duty_cycle ( pwm_steering_duty_cycle ); // call output function with calculated value
            pwm_speed_duty_cycle = ((speed_value + 1536) / 3.41);// output calculation, limits motor power to 50%
            set_speed_duty_cycle ( pwm_speed_duty_cycle ); // call output function with calculated value
            }
    }
    if (position == 2) // front left
        {
        if ( steering_value < 512) // curve inner wheel, direct match steering value and correct speed value
            {
            pwm_steering_duty_cycle = ((steering_value + 4608) / 6.83); // output calculation, limits steering to +/− 30 degree
            set_steering_duty_cycle ( pwm_steering_duty_cycle ); // call output function with calculated value
            speed_value = ((−0.0352 * speed_value) + 0.9356); // y = −0.0352x + 0.9356
            pwm_speed_duty_cycle = ((speed_value + 1536) / 3.41);// output calculation, limits motor power to 50%
            set_speed_duty_cycle ( pwm_speed_duty_cycle ); // call output function with calculated value
            }
        if ( steering_value > 512) // curve outer wheel, correct steering value and direct match speed value
            {
            steering_value = ((1.6349 * steering_value) + 2.224); // y = 1.6349x + 2.224
```

TABLE 1-continued

```
            pwm_steering_duty_cycle = ((steering_value + 4608) / 6.83);// output calculation, limits steering to +/- 30 degree
            set_steering_duty_cycle ( pwm_steering_duty_cycle ); // call output function with calculated value
            pwm_speed_duty_cycle = ((speed_value + 1536) / 3.41);// output calculation, limits motor power to 50%
            set_speed_duty_cycle ( pwm_speed_duty_cycle ); // call output function with calculated value
            }
    }
    if (position == 3) // rear left
        {
            if ( steering_value < 512) // curve inner wheel, direct match inverted steering value and correct speed value
                {
                steering_value = (512 + (512 - steering_value)); // inverts steering value for rear position
                pwm_steering_duty_cycle = ((steering_value + 4608) / 6.83); // output calculation, limits steering to +/- 30 degree
                set_steering_duty_cycle ( pwm_steering_duty_cycle ); // call output function with calculated value
                speed_value = ((-0.0352 * speed_value) + 0.9356); // y = -0.0352x + 0.9356
                pwm_speed_duty_cycle = ((speed_value + 1536) / 3.41);// output calculation, limits motor power to 50%
```

As will be appreciated by one of ordinary skill in the art of the invention, the present invention includes a large number of alternate configurations, combinations, and enhancements. For example, Michelin has developed a related technology called Tweel, which is a run flat tire which contains no air, but makes use of deformable rubber elements allowing for the same stability and suspension performance as an inflated car wheel. The Tweel is tested and has been used in construction machines and sports gear. The benefits of combining Tweel technology with wheel robots will be clear to one of skill in the art.

In other alternate configurations, a damper may be added as a diagonal connection between the double wishbone suspension arms in order to achieve improved suspension capabilities. The steering actuator may be replaced by a piston-like, linear actuator that can be mounted between the connector plate and the motor mounting bracket using flexible fixtures to compensate for suspension motion. Preferably, the connector and electronics should be properly enclosed. For example, the previously-discussed PML in-wheel motor already comes fully water proof according to IP 65 standards. The overall structure can be made out of light-weight materials, such as, but not limited to, fiber-reinforced composites and light weight alloys in order to save energy.

The full-scale version will typically employ more advanced electronics. The wheel robot CPU preferably communicates on a CAN bus. In addition, the embedded computational capabilities may be enhanced and/or have more sensors. For example, a high precision steering sensor and a wheel motion sensor are recommended. A road sensor could serve an active suspension. Also temperature sensors would protect the motor and the drive electronics. Because of its spring loaded suspension a wheel robot vehicle should be racked up to release the suspension force before changing the unit. This method can be inconvenient; however, the problem may be solved with an active suspension or a conventional damper with a lock-out feature similar to a bicycle wheel.

In the preferred embodiment, the present invention utilizes standard parts and reduces the overall number of parts. However, these components are arranged more parsimoniously which increases the effectiveness of the design. For example, simplifying and augmenting the traditional wheel assembly by using the electric motor in three ways eliminates brakes. Replacing pivot joints with flexure joints eases manufacturing processes by reducing the number of components and costs. The only entirely new component is the connector which is placed in a location where traditional cars do not have a connector. However, this connector enables a modular vehicle architecture which in turn also simplifies fabrication by reducing the complexity of the car-body. The absence of an internal combustion motor, a drive train and gear box, a cooling system, a hydraulic system and many more components outweighs the costs of building standardized connectors between wheel robots and car bodies.

By relocating elements closer to their functional space new arrangements and combinations of functions emerged, most notably the wheel robot. These units contain all the parts needed to propel the vehicle and can be attached to different kinds of vehicles through a standardized structural, electric and data signal. The approach brings together many existing technologies for wheels such as in-wheel motors and integrated steering actuators. Combining in-wheel motors, steering actuators, and in-wheel suspension and modularity into one unit and proving its feasibility for the private vehicle sector constitutes an innovative approach introduced by the group. The wheel robot supports a modular vehicle architecture that significantly reduces constraints on vehicles designers and engineers. Vehicle fabrication and assembly will become easier, more efficient and cost effective. Vehicle operation will also benefit from low-maintenance wheel robots. Even vehicle culture can evolve to include notions of customization and adaptation.

In various embodiments and aspects, the present invention comprises a robot wheel assembly that has a structural connector between a vehicle and a robot wheel, a robot wheel assembly in which the structural connector is located at the edge of the wheel motion envelope and on the side of the wheel, a robot wheel assembly that has an electrical connector between vehicle and robot wheel that can be integrated into the structural connector or be a separate component, a robot wheel assembly that has a data-electrical connector between vehicle and the robot wheel and which can be integrated into the structural connector, be a separate component, or be replaced with a wireless system, and a robot wheel assembly that has suspension components located between the structural connector and the wheel. In various embodiments and aspects, the present invention further comprises a robot wheel assembly that covers 150 degrees of steering, a robot wheel assembly that has a computational device, such as a microcontroller or CPU, to read out sensors and participate on a data bus in order to compute the wheel's specific behavior, a robot wheel assembly that has a sensor that measures wheel revolutions, a robot wheel assembly that has a sensor that measures the steering position of the wheel, and a robot wheel assembly that has a sensor that measures acceleration of the robot wheel in back/forward, left/right and up/down direction.

While a preferred embodiment is disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims that follow.

What is claimed is:

1. An autonomous modular wheel control assembly, comprising:
    at least one connector for connecting the wheel control assembly to a vehicle axle, the connector comprising one or more electrical connection points for providing power and information to the wheel control assembly;
    one or more suspension arms for supporting the wheel control assembly with respect to the vehicle axle, the suspension arms being connectable to the axle by means of the connector;
    an electric drive motor connected to a motor mount and connectable to a vehicle wheel, the electric drive motor adapted for controlling the operation of the vehicle wheel and for acting on commands received from a controller configured to control the electric drive motor;
    a steering bearing connected to the electric drive motor mount; and
    a steering actuator connected between the suspension arms and the steering bearing, the steering actuator being adapted to act on steering and drive commands received from a controller configured to control the steering actuator.

2. The wheel assembly of claim 1, further comprising at least one sensor for detecting vehicle motion data.

3. The wheel assembly of claim 2, wherein the at least one sensor includes at least one sensor selected from the group consisting of a wheel revolution sensor, a wheel steering sensor, and an acceleration sensor.

4. The wheel assembly of claim 2, further comprising an on-board controller for analyzing vehicle motion data obtained from the at least one sensor and directing the wheel assembly to respond.

5. The wheel assembly of claim 1, further comprising a wheel assembly power source.

6. The wheel assembly of claim 1, wherein the suspension arms are flexible.

7. The wheel assembly of claim 1, further comprising a vehicle wheel hub connected to the electric drive motor.

8. The wheel assembly of claim 1, further comprising a wheel assembly power source.

9. An autonomous modular wheel assembly, comprising:
    a vehicle wheel, comprising a hub connectible to a tire; and
    an autonomous modular wheel control assembly, wherein the vehicle wheel is adapted to receive the wheel control assembly, the wheel control assembly comprising:
        an electric drive motor to the vehicle wheel, the electric drive motor adapted for controlling the operation of the vehicle wheel and for acting on commands received from a controller configured to control the electric drive motor;
        a motor mount connected to the electric drive motor;
        a steering bearing connected to the electric drive motor mount;
        a steering actuator connected to the steering bearing, the steering actuator being adapted to act on steering commands received from a controller configured to control the steering actuator;
        one or more suspension arms, connected to the steering actuator, for supporting the wheel with respect to a vehicle axle; and
        at least one connector for connecting the wheel via the suspension arms to the vehicle axle, the connector comprising one or more electrical connection points for providing power and information to the wheel.

10. The wheel assembly of claim 9, further comprising at least one sensor for detecting vehicle motion data.

11. The wheel assembly of claim 10, wherein the at least one sensor includes at least one sensor selected from the group consisting of a wheel revolution sensor, a wheel steering sensor, and an acceleration sensor.

12. The wheel assembly of claim 10, further comprising an on-board controller for analyzing vehicle motion data obtained from the at least one sensor and directing the wheel to respond.

13. The wheel assembly of claim 9, further comprising a wheel power source.

14. The wheel assembly of claim 9, wherein the suspension arms are flexible.

15. An assembly for controlling an autonomous modular wheel and connecting the wheel to a vehicle chassis, comprising:
    a vehicle axle connectible to the vehicle chassis;
    at least one connector for connecting a wheel control assembly to the vehicle axle, the connector comprising one or more electrical connection points for providing power and information to the wheel control assembly;
    one or more suspension arms for supporting the wheel control assembly with respect to the vehicle axle, the suspension arms being connectable to the axle by means of the connector;
    an electric drive motor connected to a motor mount and connectable to the vehicle wheel, the electric drive motor adapted for controlling the operation of the vehicle wheel and for acting on commands received from a controller configured to control the electric drive motor;
    a steering bearing connected to the electric drive motor mount; and
    a steering actuator connected between the suspension arms and the steering bearing, the steering actuator being adapted to act in response to steering and drive commands received from a controller configured to control the steering actuator.

16. The wheel assembly of claim 15, further comprising at least one sensor for detecting vehicle motion data.

17. The wheel assembly of claim 16, further comprising an on-board controller for analyzing vehicle motion data obtained from the at least one sensor and directing the wheel assembly to respond.

18. The wheel assembly of claim 16, wherein the suspension arms are flexible.

* * * * *